Nov. 20, 1928.
A. JENSEN
1,692,270
APPARATUS FOR TREATING LIQUIDS
Filed Jan. 10, 1927   3 Sheets-Sheet 1
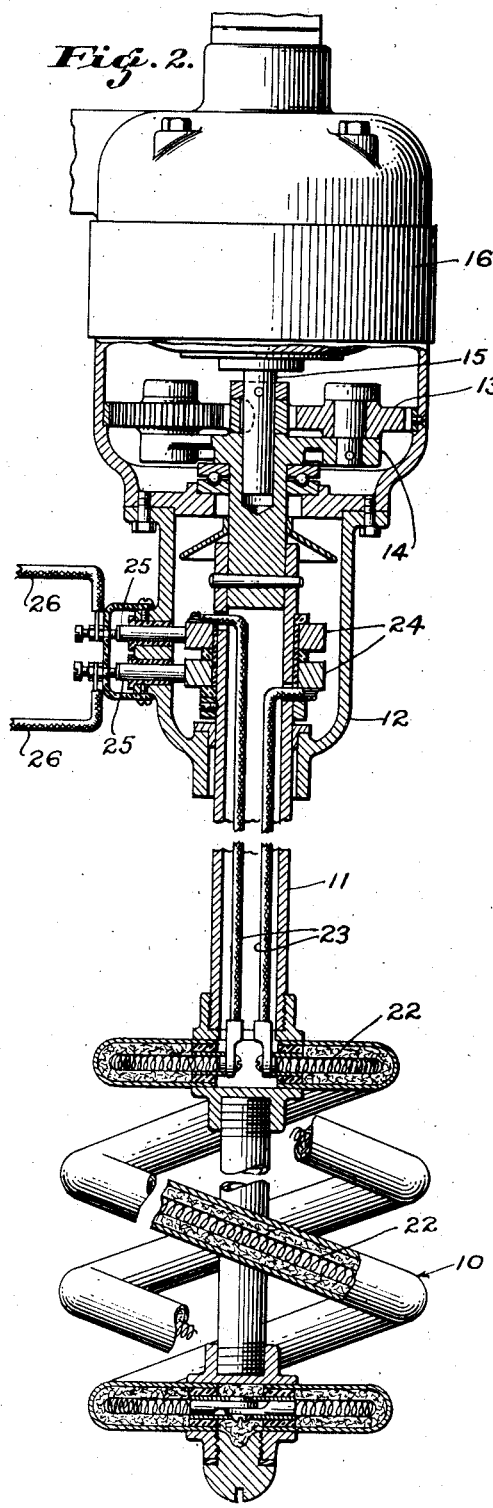
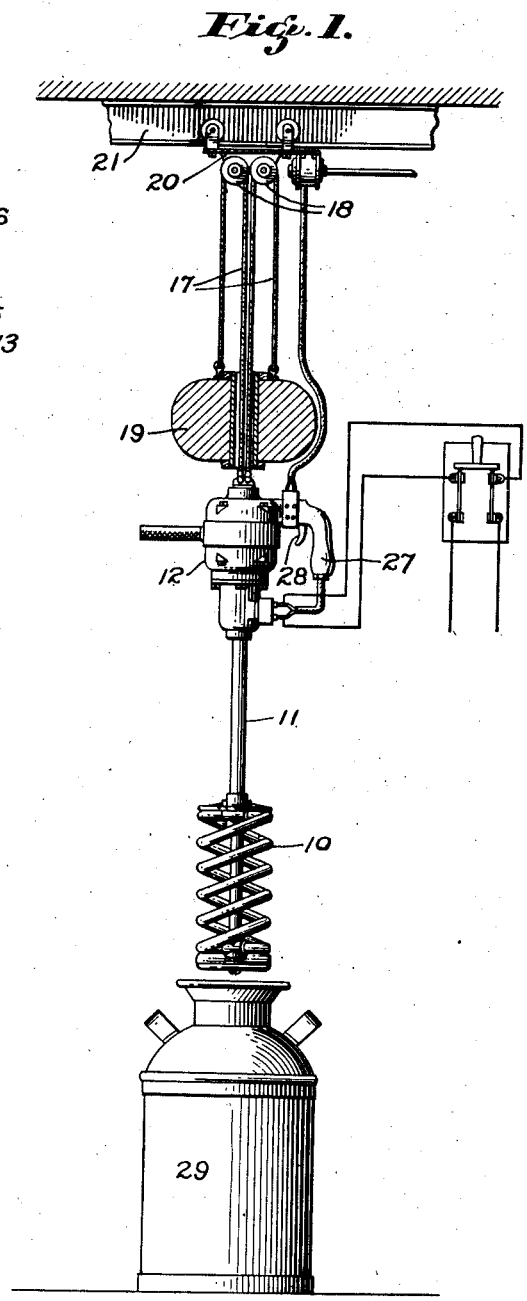
INVENTOR.
Aage Jensen.
BY
Townsend, Loftus & Affat
ATTORNEYS.

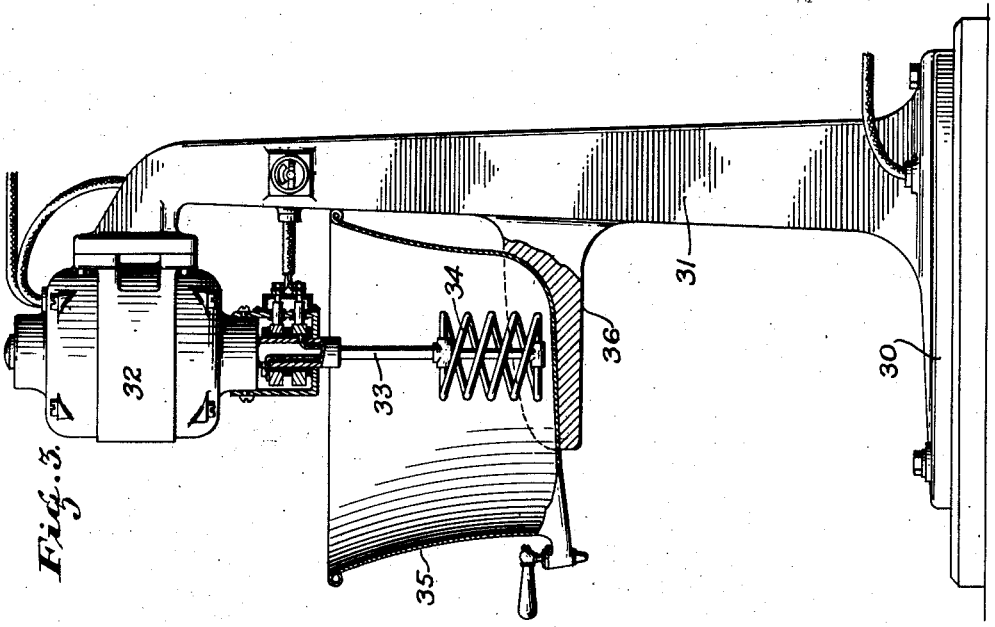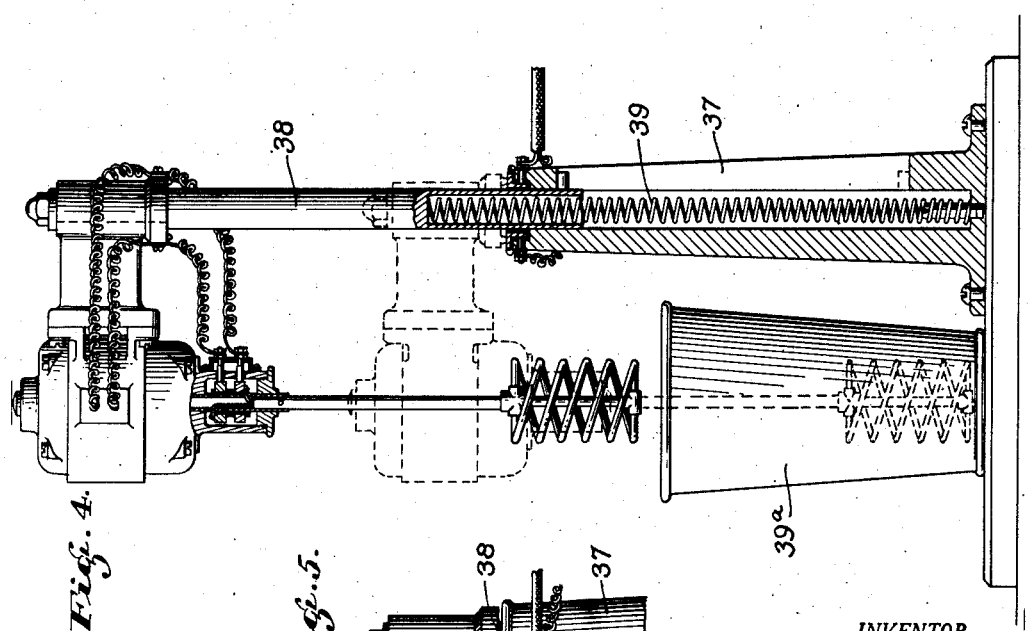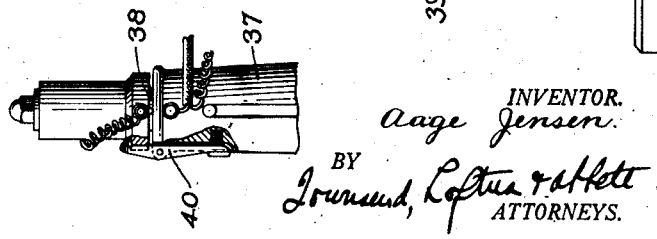

Nov. 20, 1928. 1,692,270
A. JENSEN
APPARATUS FOR TREATING LIQUIDS
Filed Jan. 10, 1927. 3 Sheets-Sheet 3
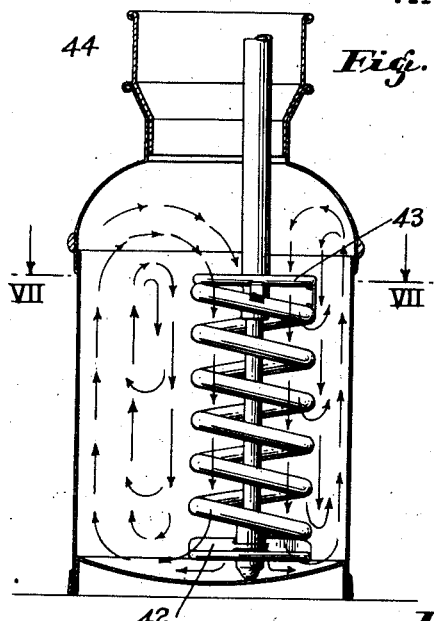
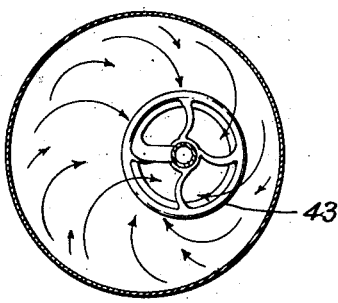
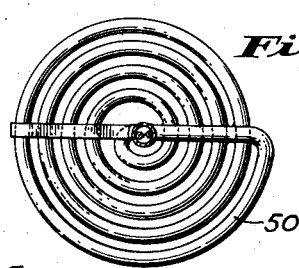
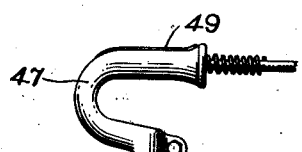
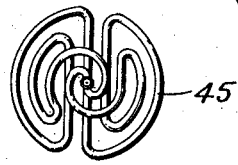
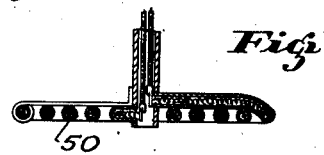
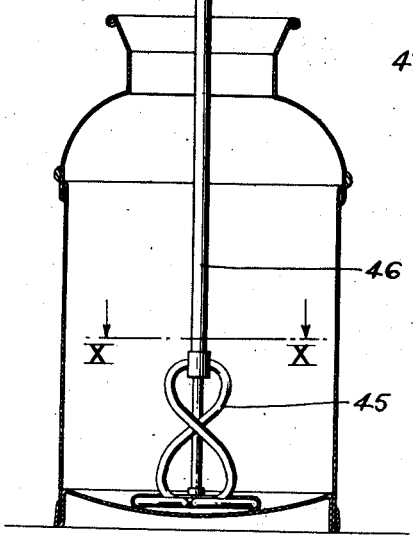
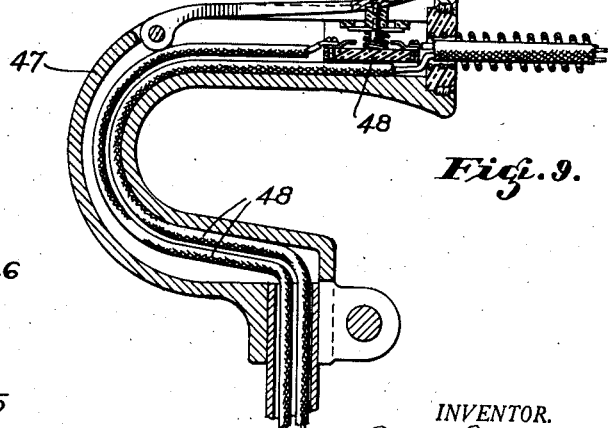
INVENTOR.
Aage Jensen.
BY
Townsend, Loftus & Abbett
ATTORNEYS.

Patented Nov. 20, 1928.

1,692,270

UNITED STATES PATENT OFFICE.

AAGE JENSEN, OF LOS ANGELES, CALIFORNIA.

APPARATUS FOR TREATING LIQUIDS.

Application filed January 10, 1927. Serial No. 160,135.

This invention relates to the treatment and conditioning of liquid substances of various kinds, and is the outgrowth of extensive investigations made by me to solve the problem of obtaining accurate samples of cream of heavy density for testing purposes. Heretofore it has been difficult to thoroughly emulsify cream for testing purposes, particularly when the ingredients have been separated by accidental churning, freezing, or abnormal development of bacteria. The prior practice has been to apply heat to the exterior of the container, mixing the contents by hand- or power-operated stirrers. Such methods are slow and cumbersome, and are faulty, owing to the impossibility of accurately controlling the temperature of the contents of the container.

In and by the present invention I make use of a stirrer which carries within it electric resistance elements. The stirrer is preferably rotated or otherwise moved by mechanical or electrical power, so that the contents of the can shall be thoroughly mixed and agitated, and simultaneously therewith heat will be applied to the contents, so as to raise the temperature to the desired degree. I find that such an electrically heated stirrer, when in motion quickly transmits its heat to the contents of the container, and can be used successfully in the treatment of various liquids, for emulsifying, heating for pasteurization, etc.

My invention has brought to light the fact that the use of electric heat applied to a rapidly moving surface submerged in a fluid substance was not known heretofore, and the advantages thereof in no wise appreciated. In fact, no data was available for computing the heat transmission of such a moving surface. The comparative efficiency of moving surfaces to stationary surfaces in the treatment of liquids shows that a coil-shaped element having 250 square inches of active surface, heated to 190° Fahrenheit and moving at the rate of 4,000 lineal inches per minute will raise a given volume of cream from a temperature of 60° Fahrenheit to 150° Fahrenheit, in approximately ten minutes; whereas, the same element not in motion would require approximately forty minutes to do the same work. Moreover, stationary heat-applying surfaces when used in the treatment of milk, cream, malt extract, eggs, chocolate, gelatinous products, and other fluid substances containing organic matter, will rapidly coat, causing loss of radiation and resulting in bad flavor, and oftentimes spoiling the product altogether. The use of electrically heated stirrers for this purpose has a further advantage of being capable of accurate control of temperature, lightness, portability of the device, and the greater ease and facility of making connections with the moving element.

The invention may be embodied in a variety of forms, and in the accompanying drawings, merely by way of illustration and example, I show several different forms of devices embodying my invention.

In said drawings,

Fig. 1 shows a side elevation partly in section, of a form of the device mounted for movement on an overhead track and adapted to be raised and lowered through a counterweight, so as to submerge the stirrer in the contents of the container;

Fig. 2 shows an enlarged view of a portion of the same device, partly in section;

Fig. 3 shows a side elevation, partly in section, of a form of the device supported upon a pedestal or standard;

Fig. 4 shows a side elevation, partly in section, of another form of the device, suitable for counter use, as, for example, in soda fountains, and including a standard having telescopic sections whereby the stirrer and its operating mechanism may be raised and lowered;

Fig. 5 is a detail view of the latching mechanism used in Fig. 4 for retaining the stirrer in lowered position;

Fig. 6 shows a vertical central sectional view of a container such as is used for transporting milk or cream, illustrating an extension for the top thereof to prevent overflowing of the contents when the stirrer is inserted therein, said stirrer being illustrated in eccentric position within the can, and the direction of currents of the fluid being illustrated by arrows;

Fig. 7 is a sectional view taken on the line VII—VII of Fig. 6;

Fig. 8 shows a side elevation of a small, hand-operated type of the electrically heated stirrer in position within a can;

Fig. 9 shows a sectional view of the handle portion of the device in Fig. 8;

Fig. 10 shows a sectional view, taken on the line X—X of Fig. 8;

Fig. 11 shows a plan view of a modified form of stirrer, wherein flat convolutions are used in place of the helix of the preceding types;

Fig. 12 shows a cross-section of the stirrer of Fig. 11.

The device shown in Figs. 1 and 2 comprises a stirrer 10, made of tubular stock formed into a double helix. It is mounted on a hollow shaft 11 extending upwardly into a housing 12, which housing encloses gearing 13, preferably of the planetary reduction type. The planetary pinions are mounted upon a carrier 14 which is directly connected the hollow shaft. The sun gear of the planetary mechanism is secured to a shaft 15 of an electric motor 16, the said motor being carried as a unit with the housing 12. The motor and housing are suspended by cables 17 passing over shives 18 and counterweighted by a weight 19. The shives are journaled on a carriage 20 operating on an overhead track 21.

Arranged within the tubes of the stirrer are resistance elements 22 supplied with current through leads 23 arranged in the hollow shaft and extending up to the conductor rings 24 carried by said shaft. These rings in turn contact with brushes 25 which extend out through the side of the housing 12, where they connect with the current-carrying means 26. Suitable switch mechanism may be arranged in the housing, controlling the flow of current to the resistance elements, and in the present instance I show a handle 27 on the side of the motor and housing having a trigger 28 which may serve to close the circuit to the resistance element when the handle is grasped to lower the stirrer into the container.

In practice a number of cans 29 containing liquid to be treated or tested, may be arranged in a row beneath the overhead track 21. The stirrer will normally be lifted by raising of the counterweight 19, and can be moved along the track to position above any one of the cans. When grasping the handle 27, the stirrer can be lowered into the can, so as to submerge the same therein, at which time the current to the resistance elements in the stirrer can be turned on, to heat the same. The motor is then put in operation, and the said stirrer caused to rotate at a fairly rapid speed, say about 4,000 lineal inches per minute. Due to the helical form of the stirrer, the contents of the can will be given a centrifugal movement, and also a vertical movement, so that the contents are thoroughly stirred and all particles brought into contact with the stirrer. As a result, the temperature of the contents of the can will be raised rapidly to a temperature approximating that of the stirrer.

In Fig. 3 I show a pedestal type of apparatus, comprising a base 30, and a standard 31. At the top of this standard is mounted the motor and gear housing, generally indicated at 32. A hollow shaft 33 extends down from the gear casing and carries a helical stirrer 34 which is submerged in the contents of a vessel 35 supported on a shelf 36 formed on the standard.

In Fig. 4 I show a small unit, suitable for soda fountains and the like. It comprises a hollow standard 37 having an upper portion 38 telescopically fitted therein, said upper portion carrying the motor and stirrer unit. A spring 39 serves to maintain the upper portion 38 in extended position normally. By moving the upper portion downwardly, the stirrer will be submerged in a container 39ª, and a latch 40 (shown in Fig. 5) is provided to retain the member 38 in depressed position. In this form of the device the contacts 40 may be arranged on the members 37 and 38 so as to close the circuit to the motor, and resistance elements in the stirrer, when the part 38 is depressed.

In Figs. 6 and 7 are illustrated by arrows the direction and nature of the current produced by the helical stirrer, from which it will be seen that the contents are given a vertical motion as well as a whirling motion. In these figures I show the stirrer as being positioned eccentrically in the container, which is sometimes preferable, owing to the fact that it thereby sets up increased friction over what would occur if the stirrer were centrally positioned in the container. Also, as shown in these views, it is sometimes desirable to employ vanes 42 at the lower end of the stirrer, to increase the agitation of the liquid. Likewise I show a ring-shaped guard 43 at the top of the coil, to protect the same while moving it in and out of the can. The movable extension 44 is shown applied to the can of Fig. 6, which has the effect of enlarging the capacity of the can so as to prevent the contents from overflowing when the stirrer is immersed therein.

In Figs. 8, 9, and 10, I show a hand-operated device, including a stirrer 45 made of tubular stock and formed with coils both of a helical and convolute nature. This coil is supported upon a hollow shaft 46, which shaft at its upper end has a handle 47. Current-carrying wires 48 pass through the handle and shaft to supply resistance elements arranged within the coil 45. Preferably a switch for controlling the current is located in the handle, as shown at 48, the same being adapted to be closed by the pivoted arm 49, which can be conveniently depressed when the handle is grasped. In practice the operator submerges the stirrer in the contents of the can and imparts to it both a reciprocating and an oscillating motion as rapidly as possible.

In Figs. 11 and 12 I show a modified form of stirrer coil which has flat convolutions 50, these containing also electric resistance elements and operating similarly to the preceding forms of stirrer.

Various other forms and shapes of stirrer elements may be employed, as, for example, disc-shaped plates.

Other changes and additions may be included; as, for example, either automatic control of the motor and heating elements so that when the stirrer is not in use the current will be cut off; or in lieu thereof, a thermostatic control may obviously be employed to cut off the current when the temperature of the liquid reaches a predetermined degree; all of which are well known in the art of electric current control.

Having thus described my invention, what I claim as new and desire to secure by Letters Patent is:

1. An apparatus for treating liquids, comprising a tubular metallic member formed into a series of convolutions, an electrically energized heating element carried within the tubular member and extending throughout the convolutions thereof for imparting heat thereto, and means whereby the tubular member may be rotated.

2. An apparatus for treating liquids, comprising a tubular metallic member formed into a series of convolutions, electric resistance elements enclosed within the said convolutions for imparting heat thereto, a hollow shaft connected with the tubular member and forming a conduit for electric conductors leading to said resistance elements, and means whereby the shaft may be rotated to impart movement to the tubular member.

3. An apparatus for treating liquids, comprising a tubular metallic member formed into a series of convolutions, electric resistance elements arranged within the convolutions for imparting heat thereto, a hollow shaft connected with the tubular member, electric conductors arranged within the said shaft and leading to the resistance elements, conductor rings surrounding the shaft, brushes contacting with said conductor rings, and means for rotating the shaft for imparting movement to the tubular member.

4. An apparatus for treating liquids, comprising a tubular member formed into a series of convolutions, electric resistance elements arranged within the coils for imparting heat thereto, a shaft connected with the tubular member, means for rotating said shaft to impart movement to the tubular member, and means for raising and lowering said shaft whereby the coils may be immersed in a liquid container and withdrawn therefrom.

5. A method of treating liquids containing organic or albuminous substances, consisting of submerging in the liquid a hollow tubular member containing resistance elements, imparting heat to said tubular member by energizing said resistance elements and imparting movement to said tubular member while in contact with the liquid at the approximate rate in excess of three thousand lineal inches per minute.

AAGE JENSEN.